United States Patent [19]

Thierion

[11] Patent Number: 5,059,086
[45] Date of Patent: Oct. 22, 1991

[54] DEVICE FOR HANDLING BOTTLES

[75] Inventor: Michel Thierion, Muizon, France

[73] Assignee: G. M. Thierion S.A., Muizon, France

[21] Appl. No.: 490,435

[22] Filed: Mar. 8, 1990

[30] Foreign Application Priority Data

Mar. 10, 1989 [FR] France ................................. 89 03162

[51] Int. Cl.⁵ ........................................... B66F 11/00
[52] U.S. Cl. ..................................... 414/626; 187/94;
294/65; 294/87.1; 414/591; 414/627; 414/673;
414/731; 414/736; 414/737; 414/780; 414/783;
414/792.9; 901/48
[58] Field of Search .................. 187/94; 198/379, 406;
414/416, 626, 627, 673, 591, 780, 783, 792.9,
731, 736, 737, 743; 901/48; 212/195, 197;
294/65, 87.1

[56] References Cited

U.S. PATENT DOCUMENTS

| 3,587,875 | 6/1971 | Carmody | 414/792.9 X |
| 4,397,130 | 9/1983 | Thierion | 53/77 |
| 4,402,173 | 9/1983 | Thierion | 414/591 X |
| 4,705,447 | 11/1987 | Smith | 901/48 X |

FOREIGN PATENT DOCUMENTS

| 0320498 | 6/1989 | European Pat. Off. | 901/48 |
| 2805290 | 8/1979 | Fed. Rep. of Germany | 414/591 |
| 1437193 | 3/1966 | France . | |
| 663659 | 5/1979 | U.S.S.R. | 212/195 |

Primary Examiner—Robert J. Spar
Assistant Examiner—Janice Krizek
Attorney, Agent, or Firm—Griffin, Branigan & Butler

[57] ABSTRACT

A bottle handling device comprising a tool for grasping the sides of the bottles, the tool being tiltably mounted to one end of a flexible cord and the other end of the cord is coupled to a balancing device for balancing the grasping tool and developing a balancing force that is adjustable between two values depending on whether the tool is loaded or unloaded. The device also has a support table for supporting a plurality of bottles standing in a row, and a backing piece mounted along the table in order to accommodate the tilting of the bottles while the value of the balance force is changing.

7 Claims, 2 Drawing Sheets

DEVICE FOR HANDLING BOTTLES

BACKGROUND OF THE INVENTION

In order to fill a case by making up layers of bottles lying on their sides, or in order to empty such a case layer-by-layer, a known manually-controlled bottle-grasping tool can be used to seize the sides of a row of bottles that are lying down or standing up for the purposes of transporting them and of tilting them. This tool is generally suspended from a swivel hoist by means of a cord, and is tiltably mounted at the free end of the cord. The height of the tool is permanently under operator control, with the cord being played out from or taken up into the hoist under control of the operator. A tool-balancing device is provided at the other end of the cord, e.g. inside the body of the hoist.

One of the problems that needs to be solved with this type of tool is to be able to adapt tool-balancing to whether or not the tool is loaded, taking account of the facts that the load to be balanced changes quickly while the bottles are being picked up or put down, and in addition, in most cases, that the load tilts at this very moment.

These rapid changes in the balance state of the tool and the movements that result therefrom firstly impart hard-to-bear shocks to the operator's arms, and secondly require the operator to apply large forces to the tool very quickly in order to control tool behavior as well as possible during these transient periods.

The invention proposes integrating means in a bottle handling device that considerably improve operator comfort, operating safety, and conditions of utilization.

SUMMARY OF THE INVENTION

To this end, the present invention provides a bottle handling device comprising a tool for grasping the sides of the bottles, the tool being tiltably mounted to one end of a flexible cord having its other end coupled to balancing means for balancing the grasping tool and developing a balancing force that is adjustable between two values depending on whether the tool is loaded or unloaded, the device also having a support table for supporting a plurality of bottles standing in a row, the device further including a backing piece mounted along the table having a convex surface directed towards the table in order to accommodate a tilting of the bottles while the value of the balance force is changing.

BRIEF DESCRIPTION OF THE DRAWINGS

An embodiment of the invention is described by way of example with reference to the accompanying drawings, in which.

DETAILED DESCRIPTION

Figure 1:
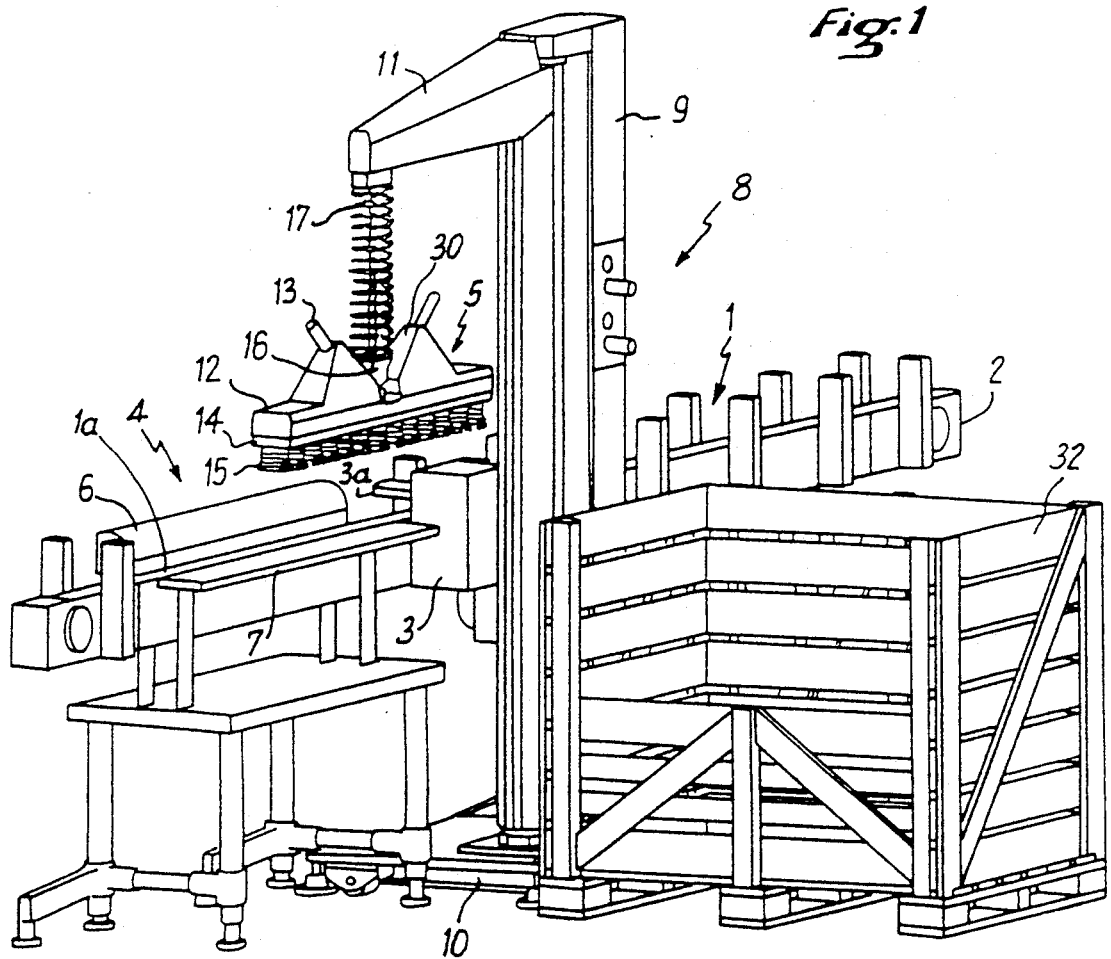
FIG. 1 is a perspective view of a device of the invention.

The bottle handling device shown in FIG. 1 comprises a conveyor 1 for connection at one of its ends 2 to the end of a bottle conveyor intended either to convey bottles to the handling device or away therefrom. The handling device shown corresponds to the first one of these possibilities and it is fitted with a counting system 3 associated with a retractable bottle abutment 3a designed to allow only a determined number of bottles to gain access to a bottle loading zone 4 at a time, said number corresponding to the capacity of a grasping tool 5 described below. The counting system 3 and its associated abutment 3a are constituted, for example, by a star mechanism meshing with each of the bottles in succession in order to count them and prevent bottles coming from the conveyor moving any further until the bottles present in the loading zone 4 have been removed. Along respective sides of a length 1a of the conveyor occupying the loading zone, there are a quarter round backing piece 6 and a support shelf 7 which is adjustable in height.

A hollow bracket hoist 8 stands on the same side of the length 1a of the conveyor 1 as the support shelf 7, the hoist having an upright 9 swivel-mounted on a base 10 about its own longitudinal axis, and a bracket arm 11 from which the grasping tool 5 is suspended. The hoist 8 is disposed adjacent to the length 1a of the conveyor 1 in such a manner that when the arm 11 is substantially parallel to the length 1a of the conveyor, the grasping tool 5 faces the loading zone 4 (the position shown in FIG. 1) and is capable, in particular, of being placed on the support shelf 7 which is provided for this purpose.

The grasping tool 5 comprises an elongate housing 12 provided with two handles 13 to enable it to be handled by the user, the housing having a strip 14 of suction cups 15 mounted thereon and connected to a vacuum generator. This generator sets up a pressure reduction at each suction cup enabling the tool 5 to be fixed by suction to as many bottles as the strip 14 includes suction cups. Between the handles 13, halfway between its ends, the housing 12 includes a coupling member 16 for coupling to one end of a suspension cord 17 and designed to allow the grasping tool 5 to tilt through 90° about its longitudinal axis. The active face of the suction cups 15 is intended to be put into contact with the cylindrical side surfaces of the bottles to be handled.

Figure 2:
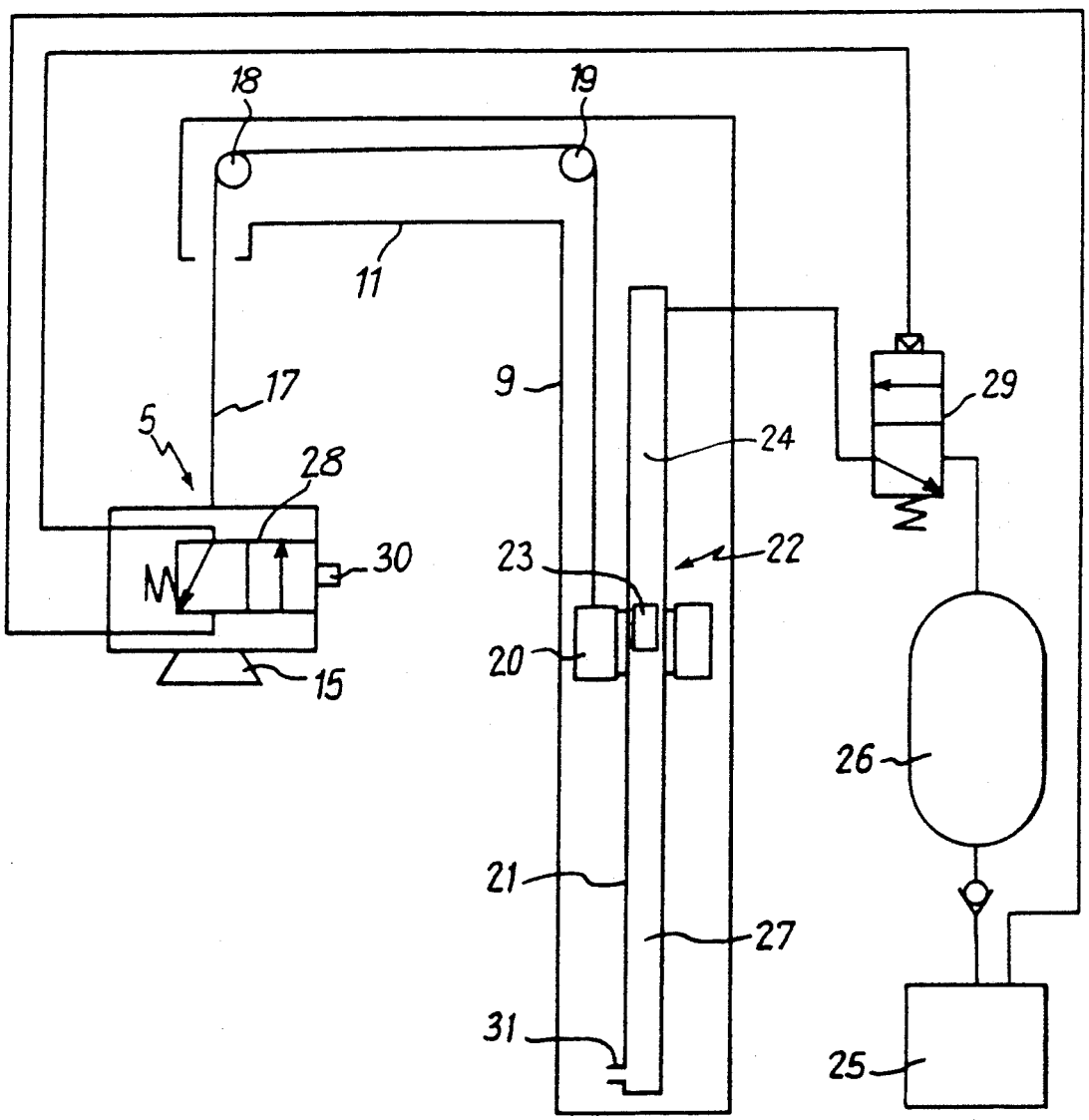
FIG. 2 is a diagram of the balancing system in the device.

As can be seen in FIG. 2, the cord 17 passes inside the hoist 9 over two pulleys 18 and 19 and its other end is coupled to a counterweight 20 which balances the grasping tool 5 when empty. The counterweight 20 is slidably guided on a substantially vertical non-magnetic tubular body 21 of a rodless pneumatic actuator 22, and it is coupled to the actuator piston 23 magnetically. When powered, this actuator acts as a gas spring. The top chamber 24 of the actuator is connected to a source 25 of compressed gas via a buffer volume 26 which is large relative to the volume of the chamber 24 so that the pressure in the chamber remains substantially constant regardless of its own volume, thereby enabling the user to raise and lower the grasping tool 5 under balanced load conditions, and therefore without effort.

The bottom chamber 27 exhausts via an opening 31.

The actuator 22 is controlled by a control member disposed on the grasping tool 5 which acts on a feed distributor valve 29 placed in the pneumatic circuit of the actuator 22, between the actuator and the buffer volume 26. This control member may itself be a feed distributor valve 28 placed in a pneumatic control circuit and operable by means of a pushbutton 30.

Figure 3A:
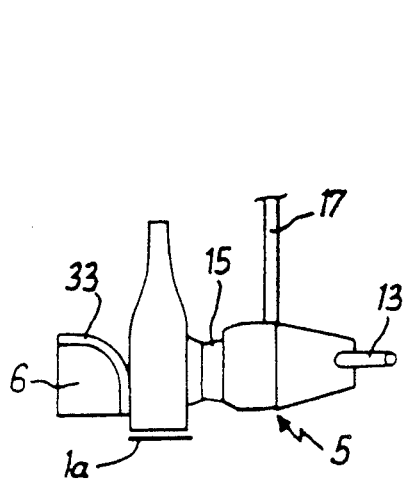
FIGS. 3a, 3b, and 3c are three diagrammatic side views of the tool while loaded and illustrating one of the operating stages of the device.
Figure 3B:
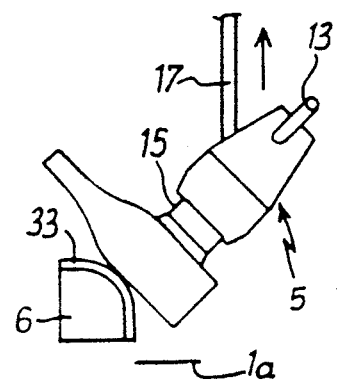
Figure 3C:
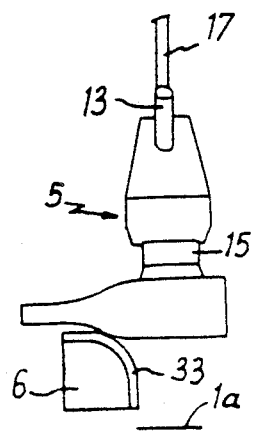

The above-described handling device operates as follows. Bottles are provided by a conveyor (not shown) to the conveyor 1 and they are conveyed in an upright row to the loading zone 4. Before entering the loading zone 4 the bottles are counted by the counting mechanism 3 which stops bottles situated upstream from the loading zone from advancing once it has counted a predetermined number of bottles equal to the number of suction cups 15 on the grasping tool. In the loading zone, bottle advance is stopped by an abutment (not shown) situated close to the end of the backing piece 6. The user then brings the empty grasping tool 5 as balanced by the counterweight 20 on its own so that it rests on the shelf 7, and the user pivots it so that the active faces of the suction cups 15 are facing the bottles. The user then pushes the tool 5 to make contact with the bottles in such a manner that each suction cup 15 coincides with a bottle, after which the user switches on the vacuum generator, thereby fixing the bottles by suction to the grasping tool 5. Since the tool when loaded in this way is no longer balanced, the user presses the pushbutton 30 to cause the chamber 24 of the actuator 22 to be fed with a pressure determined by the balancing force that is to be provided (which depends on the number and type of bottles being handled). Since the pressure rises very quickly in the actuator, the loaded device 5 is jerked upwards by a traction force which is not counterbalanced until the bottles have been lifted off the length 1a of the conveyor 1. Simultaneously, the tool tilts because the center of gravity of the load is offset relative to the point at which the tool is suspended from the cord. In order to make use of this traction while easily controlling the tilting, the user of the device makes use of the backing piece 6 in the manner illustrated by FIGS. 3a to 3c. In FIG. 3a, the loaded tool 5 is not balanced, and it is pressed against the length 1a of the conveyor 1 with the upright bottles being in contact with the backing piece 6. The backing piece is covered with a layer 33 of resilient material having a high coefficient of friction, e.g. foam rubber, in order to improve adherence between the bottles and the backing piece and in order to protect the bottles. In FIG. 3b, the user has switched on the actuator 22 and presses against the bottles so that they roll over the backing piece 6 while the tool 5 is pulled upwards and tilts about its longitudinal axis since it is subjected to a force greater than the effective weight of the load which is supported in part by the backing piece. In FIG. 3c, the grasping tool is shown at the end of its tilting motion and is balanced by the combined action of the counterweight 20 and of the actuator 22, with the bottles then being in the lying-down position.

In this equilbrium position, the user can raise and lower the loaded tool without effort, for example to move it from the loading zone 4 to a case disposed adjacent to the hoist 8 on the opposite side thereof to the length of conveyor 1. In order to place the bottles in the case, the user lowers the grasping tool into the case and places the bottles in the desired position. The user then purges the actuator 22 and then switches off the vacuum generator. The grasping tool releases the bottles and remains in place, in an equilibrium position due to the action of the counterweight 22 on its own.

In order to unload bottles held by the grasping member 5 onto a table fitted with a backing piece 6, the manipulation described with reference to FIGS. 3a to 3c is performed in the reverse order, i.e. the necks of the horizontally extending bottles are initially placed on the top of the backing piece 6 (FIG. 3c), with the tool 5 being balanced, after which the actuator 22 is purged. The loaded grasping tool is then no longer balanced and begins to move down in controlled manner with the bottles being tilted to the standing position by bearing against the backing piece while the tool is caused to tilt (FIGS. 3b, 3a).

The invention is not limited to the embodiment described above and variants may be made thereto. In particular, the counterweight 20 could be replaced by an actuator kept permanently under pressure and serving to balance the grasping tool 20 when unloaded.

I claim:

1. A bottle handling device comprising a tool for grasping the sides of bottles and for moving a plurality of the bottles from or to a support table on which the bottles are positioned standing vertically in a row and for tilting the bottles with respect to the table, the tool tiltably mounted to one end of a flexible cord having the other end of the cord coupled to balancing means for balancing the tool and developing a balancing force that is adjustable between two values depending on whether the tool is loaded or unloaded, and wherein the device includes a backing piece mounted along the table having a convex surface directed towards the table in order to partially support the bottles when being tilted while the value of the balance force is changing.

2. A device according to claim 1, including a support shelf running along the table at an adjustable height for receiving the tool.

3. A device according to claim 1, wherein the table is constituted by an end length of a bottle conveyor.

4. A device according to claim 3, including a counting mechanism for controlling the admission of a determined number of bottles onto the table-forming end length of the conveyor, said mechanism being associated with a retractable abutment for retaining a portion of the row of bottles upstream from said table-forming end length.

5. A device according to claim 1, wherein the balancing means comprise a pneumatic actuator constituting a gas spring for balancing the load with an actuator chamber being fed with gas under pressure or purged by means of a valve controlled by a control means disposed on the tool.

6. A device according to claim 5, wherein the balancing means include a fixed-mass counterweight for balancing the tool when unloaded, said counterweight being coupled to a piston of the pneumatic actuator.

7. A device according to claim 5, wherein the pneumatic actuator is a rodless actuator.

* * * * *